United States Patent
Beno et al.

(10) Patent No.: US 6,834,988 B2
(45) Date of Patent: Dec. 28, 2004

(54) ENHANCED THERMAL INDICATOR LIGHT SYSTEM AND METHOD FOR THE USE THEREOF

(75) Inventors: Steven Beno, Gurnee, IL (US); Erven Gaines, Skokie, IL (US); Mike Long, Skokie, IL (US)

(73) Assignee: General Binding Corporation, Skokie, IL (US)

( * ) Notice: Subject to any disclaimer, the term of this patent is extended or adjusted under 35 U.S.C. 154(b) by 78 days.

(21) Appl. No.: 10/287,641

(22) Filed: Nov. 5, 2002

(65) Prior Publication Data

US 2004/0085753 A1 May 6, 2004

(51) Int. Cl.[7] .......................... F21V 21/00; F21V 25/10
(52) U.S. Cl. .................. 362/580; 362/276; 362/802; 219/388; 156/499
(58) Field of Search ............................ 362/580, 89, 92, 362/276, 802, 294; 219/388; 156/499; 358/302

(56) References Cited

U.S. PATENT DOCUMENTS

| | | | | |
|---|---|---|---|---|
| 3,901,758 A | * | 8/1975 | Humphries | ................. 156/499 |
| 4,484,233 A | * | 11/1984 | Strout et al. | ................. 358/302 |
| 5,369,246 A | * | 11/1994 | Nanos | ......................... 219/388 |
| 5,982,969 A | * | 11/1999 | Sugiyama et al. | .......... 385/123 |
| 6,302,552 B1 | * | 10/2001 | Ross et al. | ..................... 362/30 |

* cited by examiner

Primary Examiner—Stephen Husar
Assistant Examiner—James W Cranson
(74) Attorney, Agent, or Firm—Martin Faier; Faier & Faier PC

(57) ABSTRACT

The present invention provides an indicator system for an appliance to notify an appliance operator that an operable temperature is reached by an element of the appliance. The indicator system comprises a light source that provides light to a linear light enhancer. The linear light enhancer transmits light from the light source along the length of the linear light enhancer, to increase the ability of an appliance operator to observe the light from the light source. The light enhancer is an optical fiber or a light tube. The invention is also directed to the incorporation of such indicator systems in appliances that require a heating period, such as for example, laminators.

7 Claims, 2 Drawing Sheets

ENHANCED THERMAL INDICATOR LIGHT SYSTEM AND METHOD FOR THE USE THEREOF

FIELD OF THE INVENTION

The present invention relates to a method and an indicator light system to provide an enhanced visual indication of an operable high-temperature status in an appliance.

BACKGROUND OF THE INVENTION

Numerous appliances require a waiting period for heated elements to reach an operable temperature before the appliances can be used for their intended purposes. Examples of such appliances include laminators, binding machines, heat sealing machines, ovens, etc. Laminators are machines that apply a polymer film over a substrate to improve the durability of the substrate. Though laminators are better known for the application of polymeric films to paper documents, they are generally known for applying a protective medium on other substrates, such as for example, sealing food in polymer pouches.

Lamination is generally recognized to be a process requiring a heat source and a machine for applying a pressure to a thin laminate material to seal a substrate. As one example, a document is fed into a laminator where a film is applied to the document, then pressurized and heat treated so that the film forms a transparent overlay that protects the document. Usually, the heat source is a hot roller, hot plate, cavity heat source, or thermal print head/platen assembly which is applied to a thin film mechanically positioned to force the film against the document.

The heat source typically converts electrical energy to thermal energy with a resistive heating element. This heat conversion process is a slow process. Moreover, as the document is fed through the laminator, the heated element cools quickly and may need to be reheated before it is able to laminate the next document. Without properly reheating the element, the next attempt at lamination may provide poor lamination or adhesion of the laminated layer. Furthermore, on occasion, the heating element may become overheated. Any attempt at lamination when the heating element is overheated my result in scorched or melted film and/or damaged substrate. It is therefore not surprising that various methods have been tried to make sure the laminator is used only when the heating element is within the operable temperature range.

For manually operated laminators, it is desirable to provide a means to notify the operator that a heating element has reached the appropriate temperature to laminate a substrate. Means for providing a visual indication that the heating element has reached the desired temperature are well-known. The most common method is a light indicator that illuminates when the desired temperature is reached. However, common light indicators are often too dim, and/or not sufficiently sensitive to provide a reliable indication that the appropriate temperature is reached. It would be desirable to provide an enhanced visual indication that heated elements in an appliance have reached the desired temperature.

In U.S. Pat. No. 5,982,969, Sugiyama et al. discloses an optical transmission tube (herein "light tube") that transmits light at the side surface, is flexible, and does not require inordinate amounts of power. According to Sugiyama et al., such a tube can be made by forming a tubular cladding with a core within the cladding that has a higher index of refraction than the cladding, and includes a strip of reflecting layer extended between the cladding and the core. Such a system may provide a means to amplify the effect of a relatively dim light source, such as, for example, a temperature indicator light.

SUMMARY OF THE INVENTION

The present invention provides an indicator system and a method to provide an enhanced visual indication of a operative high-temperature status in an appliance. Further, the present invention is also directed to appliances, in particular laminators, incorporating such indicator systems and using such methods.

In one embodiment, an indicator system comprises a light source that provides light to a linear light enhancer. The linear light enhancer transmits light form the light source (preferably an LED) along the length of the linear light enhancer (preferably a light tube), to increase the ability of an appliance operator to observe the light from the light source. Another embodiment includes incandescent light as a light source. In a further embodiment, the light enhancer is an optical fiber. In another embodiment, the light enhance is a light tube, as defined herein. Further embodiments include the incorporation of such indicator systems in appliances that require a heating period, such as for example, laminators.

BRIEF DESCRIPTION OF THE DRAWING FIGURES

DETAILED DESCRIPTION OF A PREFERRED EMBODIMENT

The invention is described by the following examples. It should be recognized that variations based on the inventive features disclosed herein are within the skill of the ordinary artisan, and that the scope of the invention should not be limited by the examples. To properly determine the scope of the invention, an interested party should consider the claims herein, and any equivalent thereof. In addition, all citations herein are incorporated by reference.

A thermal indicator according to the present invention comprises a light source coupled to a linear light enhancer. A power source is connected to the light source through an electronic circuit that provides sufficient power to illuminate the light source only when an operable temperature is reached for a heating element connected to the electronic circuit. Among numerous examples of light sources are light emitting diodes and incandescent light bulbs. Linear light enhancers include optical fibers, reflecting polymers, lenses and light tubes. Linear light enhancers may also have a measure of flexibility which allows the light to be formed into different shapes, aside from just straight lines.

Figure 1:
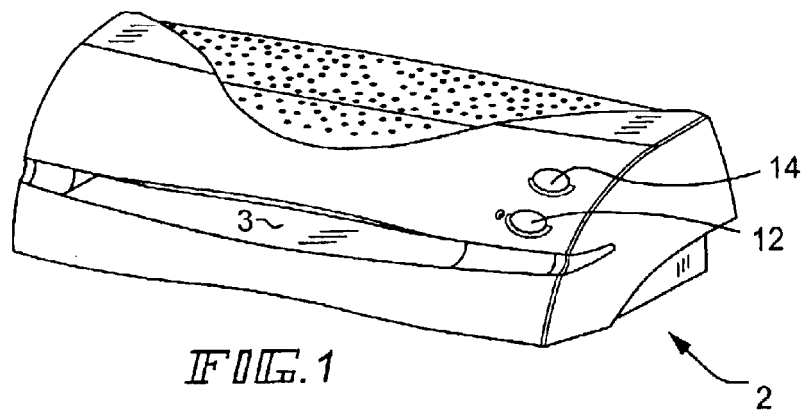
FIG. 1 is a perspective view of an exemplary laminator that incorporates an indicator system according to the invention.

Although the thermal indicator according to the present invention can be incorporated with any appliance that has an element that operates at a particular temperature, for the purpose of illustrating the invention, herein, the indicator system is incorporated in a laminator 2 as shown in FIG. 1. In relevant part, the thermal indicator (see FIG. 2), is seen through window 3, and is powered by power switch 12 and heater switch 14.

Figure 2:
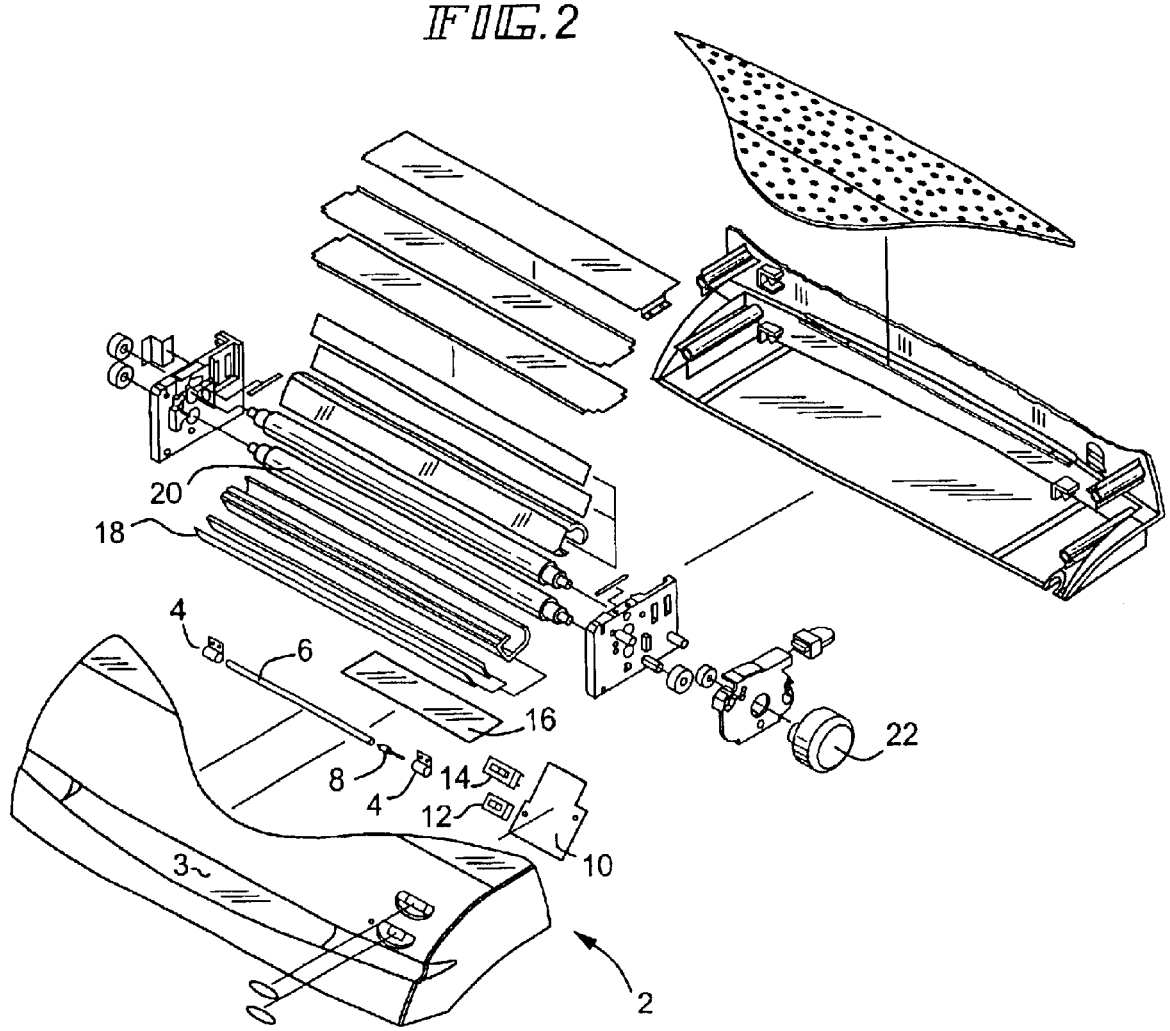
FIG. 2 is an exploded view of the laminator shown in FIG. 1 that incorporates an indicator system according to the invention.

FIG. 2 provides an exploded view of laminator 2. The illustrative relevant parts include a set of light tube holders 4, a light tube 6, a light source 8 (preferably an light emitting diode (LED)). Switch circuit board 10 having a power switch 12 and a heater switch 14 (three-position shown, but numerous variations are possible) provide power to the main circuit board 16 and the heaters 18. The heaters 18 provide heat to a hot roller 20 which is driven by a motor 22 (also powered from switch circuit board 10). Note that the light source 8 is coupled to an end of light tube 6.

In a preferred embodiment, a light tube according to U.S. Pat. No. 5,982,969 is the linear light enhancer used to enhance the visualization of a LED. The light tube comprises a tubular cladding having an outer surface, a core within the cladding having a higher index of refraction than the cladding and a reflecting layer in a strip extending between the cladding and the core. Preferably, the cladding is a fluoronated polymer, the core is an acrylic polymer and the reflecting layer incorporates light scattering particles.

Figure 3:
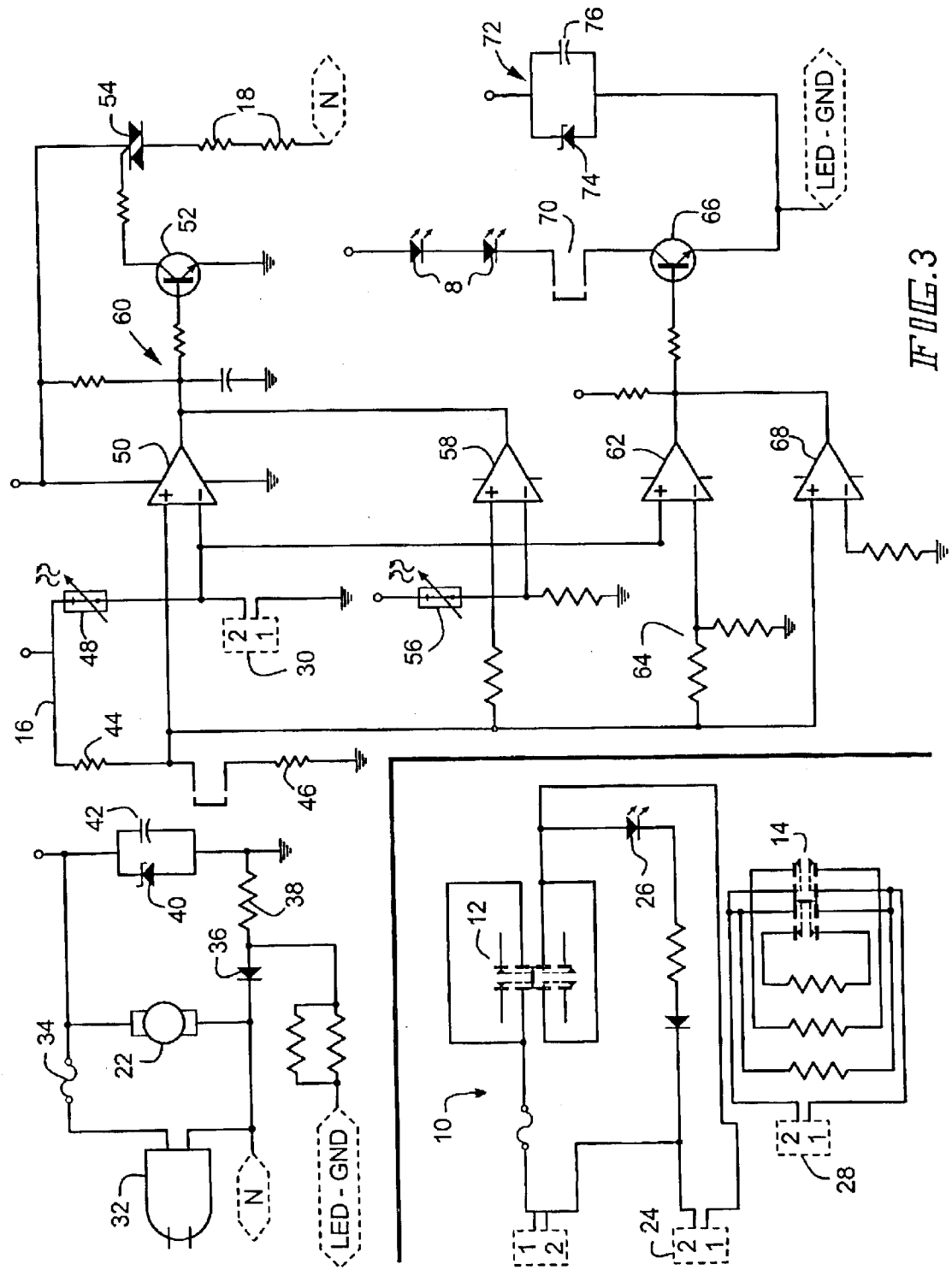
FIG. 3 is a circuit diagram illustrating the indicator system in a laminator.

Numerous electronic circuits are known for regulating the light source that indicates a heating element has reached an operable temperature. FIG. 3 provides an illustrative circuit diagram for a laminator. A switch circuit board 10 houses two switches. Power switch 12 is an on/off switch that provides power to the AC link 24 that feeds the main circuit board 16, and restricts the voltage through the circuit. Power LED 26 provides a visual indication that the machine is turned on. Heater switch 14 is connected to Junctions 28 and 30, and serves to provide power for the heaters by utilizing various resistor values in the circuit that sets up the input for turning the heaters on and off.

An AC Link 32 receives power from the switch circuit board 10 and feeds the motor 22 used to drive the roller 20 that provide the pressure and heat to laminate the substrates. An optional fuse 34 is used to prevent short circuits.

The current is converted to AC to DC where a diode 36 and a resistor 38 harvests a portion of the power wave, and is attenuated by the load regulator of the Zener diode 40 and capacitor 42 to steady the power. The power is transmitted through a network of 10K and 20K resistors, 44 and 46 respectively, to bring the voltage into the working range. The power is fed into a first Negative Temperature Coefficient (NTC) sensor 48. NTC 48 is a thermally sensitive coefficient resistor (thermistor) used to measure temperature changes across the heaters 18. When the temperature is low, NTC 48 sends out a higher voltage signal. NTC 48 is also connected to the switchboard circuit board via junction 30 which controls the operating temperature, depending on the thickness of the laminate. The switch circuit board provides the appropriate voltage signal to comparator 50. The signal is fed into an inverted input (−) and compared to non-inverted input (+).

As the temperature of the heater increases, the voltage signal to the inverted input (−) will increase and reduce the output signal to NPN transistor 52. If the signal to the NPN transistor 52 is appropriate, the NPN transistor 52 switches on a three dimensional, bi-directional thyristor (controlled diode; Triac 54) to power up the heaters 18. The Triac 54 is triggered into conduction when the transistor applies a signal to a Triac conducting gate (not shown). When the latch amperage of the gate of the Triac is reached, the Triac 54 will conduct electricity to the heaters 18.

A second NTC sensor 56 operates in essentially the same fashion as NTC 48. However, it senses the temperatures of roller 20 that contact the lamination media, and feeds a signal into the invert input (−) of comparator 58. The invert input signal is compared with the non-invert signal (+), and the resulting signal is combined with the output for comparator 50. The combined signal is filtered by a capacitor and resistor circuit 60 to clean the signal. When the combined signal reaches the right magnitude, it triggers the NPN transistor 52 to activate the Triac gate.

When the heater temperature exceeds the required temperature, NTC 48 and 56 will increase the voltage signal fed into the inverted input, and the resulting output voltage signal from comparator 50 is lowered to trigger the NPN transistor 52 to effectively shut down conductance to the heaters 18. The cycle of heating and cooling maintains the heaters within an operational range for lamination.

Comparator 62 turns on LED 8 when the temperature of the unit is appropriate for lamination. Comparator 62 shares the same signal as comparator 50 and is fed in as an non-inverted signal (+). The inverted signal (−) is a constant resulting from a voltage drop between an 120K and 7.5M resistive circuit 64. When the temperature of the heaters is operable for lamination, comparator 62 sends out a signal to NPN transistor 66 to turn on LED 8. When the LED illuminates, its signal is amplified by the light tube 6.

Comparator 68 works in conjunction with Comparator 62 to trigger LED 8. Comparator 68 provides a signal that is inversely proportionate with the signal from Comparator 62 to ensure that LED 8 is activated only when the heaters reach the appropriate temperature range. Its non-inverted signal (+) is a constant, and its inverted input (−) is a variable function of the temperature sensor NTC 48 signal which decreases as the temperature of the heater increases. Like comparators 50 and 58, the signals from comparators 62 and 68 are combined and sent to NPN transistor 66 to turn on LED 8 when the temperature is operable for lamination. The signal from the NPN transistor 66 is down-sized by a resistive circuit 70 and balanced by a load regulator 72 that is made from a Zener diode 74 (a semi-conductor device that operates to limit voltage when reverse biased by taking advantage of the breakdown properties of the PN junction) and capacitor 76. The voltage is kept constant to reduce offset and fluctuations in the power and flickering in the LED.

While a preferred embodiment of the present invention has been disclosed and described in considerable detail, it should be understood that many changes and modifications may be made in the structure and method shown without departing from the spirit or scope of the invention. Accordingly, the invention should not be limited, except according to the appended claims.

We claim:

1. A thermal indicator system for an appliance enclosed within a cabinet, said system comprising a light source consisting of a light emitting diode coupled to a linear light enhancer consisting of a linear light tube, wherein a power source is connected to the light emitting diode through an electronic circuit that provides sufficient power to illuminate the light emitting diode only when an operable temperature is reached for a heating element connected to the electronic circuit, said light emitting diode and said linear light tube being enclosed within said cabinet and causing glowing illumination along the length of said tube when operable.

2. The thermal indicator system according to claim 1 wherein the light tube comprises a tubular cladding having an outer surface, a core within the cladding having a higher index of refraction than the cladding and a reflecting layer in a strip extending between the classing and the core.

3. The thermal indicator system according to claim 1 wherein the appliance is a laminator.

4. An appliance enclosing a thermal indicator system, said system comprising a light source consisting of a light emitting diode coupled to a linear light enhancer consisting of a tubular cladding having an outer surface, a core within the cladding having a higher index of refraction than the cladding and a reflecting layer in a strip extending between the cladding and the core, wherein a power source is connected to the light emitting diode through an electronic circuit that provides sufficient power to illuminate the light emitting diode only when an operable temperature is reached for a heating element connected to the electronic circuit, said light emitting diode and said linear light tube being enclosed within said appliance and causing glowing illumination along the length of said tube visible from the exterior of said appliance when operable.

5. The thermal indicator system according to claim 4 wherein the linear light enhancer is a light tube comprising a tubular fluorinated polymer cladding having an outer surface, an acrylic polymer core within the cladding having a higher index of refraction than the cladding and a reflecting layer in a strip extending between the cladding and the core, wherein the reflecting layer incorporates light scattering particles.

6. A method of providing a visual indicator that a heated element in an appliance has reached its operational temperature range comprising:

providing aan indicator system in the appliance comprising a light source having a light emitting diode coupled to a linear light emitting tube, wherein a power source is connected to the light source through an electronic circuit that is also connected to a heating element;

providing sufficient power to illuminate the light source when the heating element reaches an operable temperature, and viewing a lighted glowing window in the appliance when the light source has been illuminated.

7. The method according to claim 6 wherein the linear light enhancer is a light tube comprising a tubular fluorinated polymer cladding having an outer surface, an acrylic polymer core within the cladding having a higher index of refraction than the cladding and a reflecting layer in a strip extending between the cladding and the core, wherein the reflecting layer incorporates light scattering particles.

* * * * *